US012049297B2

United States Patent
Manohar et al.

(10) Patent No.: US 12,049,297 B2
(45) Date of Patent: Jul. 30, 2024

(54) ELECTRIC DUCTED FAN PROPULSOR

(71) Applicant: Greenjets Limited, Herts (GB)

(72) Inventors: Anmol Manohar, Oakley (GB); Guido Monterzino, Oakley (GB)

(73) Assignee: Greenjets Limited, Herts (GB)

( * ) Notice: Subject to any disclaimer, the term of this patent is extended or adjusted under 35 U.S.C. 154(b) by 0 days.

(21) Appl. No.: 18/030,982

(22) PCT Filed: Oct. 11, 2021

(86) PCT No.: PCT/GB2021/052624
§ 371 (c)(1),
(2) Date: Apr. 7, 2023

(87) PCT Pub. No.: WO2022/074405
PCT Pub. Date: Apr. 14, 2022

(65) Prior Publication Data
US 2023/0391445 A1    Dec. 7, 2023

(30) Foreign Application Priority Data

Oct. 9, 2020 (GB) ..................... 2016077

(51) Int. Cl.
*B64C 11/48* (2006.01)
*B64C 11/00* (2006.01)
*B64D 15/00* (2006.01)
*B64D 27/24* (2006.01)
*B64D 35/06* (2006.01)
*F02K 3/072* (2006.01)
(Continued)

(52) U.S. Cl.
CPC ............ *B64C 11/001* (2013.01); *B64C 11/48* (2013.01); *B64D 15/00* (2013.01); *B64D 27/24* (2013.01); *B64D 35/06* (2013.01); *F02K 3/072* (2013.01); *F02K 3/08* (2013.01); *F02K 5/00* (2013.01)

(58) Field of Classification Search
CPC ....... B64C 11/001; B64C 11/48; B64C 15/00; B64D 27/24; B64D 35/06; F02K 3/072; F02K 3/08; F02K 5/00
See application file for complete search history.

(56) References Cited

U.S. PATENT DOCUMENTS

2006/0049304 A1   3/2006   Sanders et al.
2009/0121073 A1*  5/2009   Doane ................ B64C 29/0066
                                              244/129.4
(Continued)

FOREIGN PATENT DOCUMENTS

EP   3 588 750 A1   1/2020
FR   3 092 822 A1   8/2020
(Continued)

OTHER PUBLICATIONS

International Search Report dated Jan. 14, 2022, in connection with International Application No. PCT/GB2021/052624.
(Continued)

*Primary Examiner* — Steven M Sutherland
(74) *Attorney, Agent, or Firm* — Wolf, Greenfield & Sacks, P.C.

(57) ABSTRACT

A propulsion system for an aircraft having a two stage contra-rotating fan system to generate thrust. The contra-rotating fan system is surrounded by an aerodynamic duct, having the power train within the duct.

11 Claims, 4 Drawing Sheets

(51) Int. Cl.
*F02K 3/08* (2006.01)
*F02K 5/00* (2006.01)

(56) References Cited

U.S. PATENT DOCUMENTS

| | | | |
|---|---|---|---|
| 2010/0083669 A1* | 4/2010 | Foster | F02C 6/206 |
| | | | 60/802 |
| 2020/0010208 A1 | 1/2020 | Peace et al. | |
| 2020/0290742 A1 | 9/2020 | Kumar et al. | |
| 2021/0114740 A1* | 4/2021 | Berkey | B64C 11/06 |
| 2022/0348338 A1 | 11/2022 | Saber | |

FOREIGN PATENT DOCUMENTS

| WO | WO 00/64736 A1 | 11/2000 | |
|---|---|---|---|
| WO | WO 2015/191017 A1 | 12/2015 | |
| WO | WO-2020227837 A1 * | 11/2020 | B64C 11/001 |

OTHER PUBLICATIONS

British Search Report dated Apr. 8, 2021, in connection with British Application No. GB2016077.6.

* cited by examiner

ELECTRIC DUCTED FAN PROPULSOR

CROSS REFERENCE TO RELATED APPLICATIONS

This Application is a national stage filing under 35 U.S.C. § 371 of International Patent Application Serial No. PCT/GB2021/052624, filed Oct. 11, 2021, which claims priority to British application number 2016077.6, filed Oct. 9, 2020. The contents of these applications are incorporated herein by reference in their entirety.

TECHNICAL FIELD

The present invention relates to an electric ducted fan propulsor

BACKGROUND ART

The present disclosure concerns propulsion for all classes of aircraft and ground vehicles that use an electric motor(s) to drive aerodynamic surfaces that produce thrust. This includes all VTOL (vertical take-off and landing), CTOL (conventional take-off and landing), STOL (short take-off and landing), STOVL (short take-off and vertical landing) aircraft, hovercraft, airships, and transportation devices that produce thrust via an electric powertrain. The energy source on the aircraft might be maybe an electrochemical battery, hydrogen driving a fuel cell or internal combustion engine generator, any carbon fuel driving a generator (gas turbine/internal combustion engine) or any other source. Examples of such aircraft include Volocopter™, Ehang™, Lilium™, Airbus Vahana™, Bell Nexus™, Eviation Alice™. The use of an electric propulsion enables many novel vehicle configurations with unique advantages that are not possible with traditional powertrains (gas turbines, internal combustion engines). At the same time, there are several challenges with these class of vehicles, such as low energy density of certain electrical energy sources (e.g. electro-chemical), heavy thermal management systems (low grade heat rejection), heavy cabling amongst others.

US2016061144A1 describes a propulsor with variable geometry inlet with a stretchable skin. Stretchable skin on inlet and outlet surfaces that are actuated temporarily for favourable hover performance.

US2011147533A1 uses elastic surfaces to morph both the inlet and outlet duct shape based on flight mode.

U.S. Pat. No. 5,364,230A, Rotor blade subassembly for a rotor assembly having ducted, coaxial counter-rotating rotors. This patent publication does not cover a ducted, coaxial contra-rotation, ducted propulsor, as such, but the underlying assembly that makes this configuration realisable. Other related patents such as U.S. Pat. No. 5,226,350A, WO2000064736A1 cover other aspects of the arrangement, namely, the drivetrain, which is not electric and aerial systems.

U.S. Pat. No. 6,431,494B1 describes contra-rotating rotors in a ducted fan arrangement but focusses on the control surfaces that enable roll control.

NASA, Development of a 32 Inch Diameter Levitated Ducted Fan Conceptual Design, 2006 (https://ntrs.nasa.gov/archive/nasa/casi.ntrs.nasa.gov/20070006851.pdf) describes a rim-driven ducted fan using a magnetic rim bearing as opposed to a central hub bearing. NASA Aquifer also has a rim driven motor with inbuilt energy storage (https://ntrs.nasa.gov/archive/nasa/casi.ntrs.nasa.gov/20200000417.pdf) US 2006049304 A1, Quiet Vertical take-off and landing aircraft using ducted, magnetic induction air-impeller rotors again uses with contra-rotating fan stages.

WO2016126231A1, Rotational ducted fan (rfd) propulsion system includes a rim driven motor and electrochemical energy storage in the duct, with a removable aft shroud containing batteries. The rotor is magnetically suspended.

WO 2015/191017 A1, Electric Engine, describes an electric ducted fan with rim driven motors driving a series of fan stages with energy supplied form a source external to the duct. Superconducting technology is claimed to be used for transfer of energy from the energy source US829966962, Rim driven thruster having transverse flux motor describes a typical rim driven thruster used in the marine world. No energy storage means are provided, so presumably the source of energy is external.

Thus, many known electric powertrains for ducted propulsors for aircraft are distributed across the aircraft. The energy storage, typically a battery pack or fuel cell, is located in the fuselage or within the wing structures. Long cables then connect the battery packs to the inverters. The inverters then connect to the electric motor via cables. The motor then drives a propeller or a ducted fan, to generate thrust. There are several inefficiencies in this arrangement.

The weight of cabling can be between $\frac{1}{10}$th and $\frac{1}{5}$th the overall weight of the powertrain. Additionally, the cabling can cause up to 5-10% of overall power loss due to its internal resistance.

Since each component is located independent of the other, each require its own housing structure, thermal management system and protection equipment. These can further increase overall powertrain weight to the point where the overall power density and energy density of the aircraft is very low.

Additionally, the heat generated from each element of the powertrain, namely, battery, motor, and inverter, is usually wasted into the ambient air. This loss can be up to 10-15% of overall power and can significantly affect overall powertrain performance.

All of the above factors result in low aircraft range and endurance. In a few electric aircraft classes such as eVTOLs, there is not enough power/energy available to get the aircraft of the ground when the requirement for reserve power is considered.

SUMMARY OF INVENTION

According to the present invention propulsion system for an aircraft is characterised in having a two stage contra-rotating fan system to generate thrust, the contra-rotating fan system having two fan stages surrounded by an aerodynamic duct, having the power train within the duct.

The expression "power train" means the energy storage, electric motor drive and inverter, engine control unit, power distribution unit, and thermal management system.

In one embodiment the propulsion system has two motors each comprising an annular stator supplied from an energy storage means in said duct and the rotor of each motor comprising permanent magnets disposed in a ring around the tips of the each fan stage, energy being supplied to the stator through one or more inverters.

Since the entire powertrain is embedded into a single unit, the cabling from battery, inverter and motor as these components are based right next to each other. Cabling is hence minimised significantly leading to a weight reduction and efficiency improvement.

The motor, invertor, and battery units since integrated into a single unit enable the mechanical housing, thermal management systems and protection equipment to be shared leading to a significant overall weight reduction.

In an embodiment, the heat generated to the ducted fans' down stream flow through a heat exchanger resulting in energy harvesting. The heat from the powertrain expands the downstream flow, which advantageously increases thrust and overall efficiency.

Ideally the battery pack, which provides high power density (W/m3) but at low specific energy (J/kg) and energy density (W/m3), and is located inside the module itself, instead of the central fuselage as in the prior art. This has an aircraft level advantage and a safety advantage over systems where the battery pack is located in the fuselage. The central fuselage space is freed up for more payload and for the placement of fuel cells powertrains in the fuselage. Fuel cells powertrains offer high specific energy (J/kg) but at a low energy density (J/m3) and power density (W/m3). When both batteries and fuel cells need to be used together, they are competing for space in the fuselage volume leading to a compromised solution. By placing the battery packs in the propulsors (away from the fuselage), and the fuel cell powertrains in the fuselage, the aircraft can take advantage of having both sources of energy and power achieving a higher overall power density and specific energy than a traditional powertrain where only one of the two energy sources are chosen. The safety advantage is that all the battery packs are not located in one central location on the aircraft close to the passengers/cargo, rather they are distributed in several propulsors around the aircraft. In case of a single failure of a pack, the damage cannot propagate to all other packs.

The propulsor module uses a contra-rotating ducted fan architecture for thrust generation as opposed to those existing system that use open propellers or single stage ducted fans. This is advantageous because ducted fans are more efficient that open propellers of the same diameter, due to thrust generation from the duct itself. Further, in this invention, the duct. In addition to producing thrust, acts as structural housing for the entire powertrain including the heat exchangers. The duct also acts as a safety shroud and protects the aircraft and payload in case of blade failure. The contra-rotating stages offer an aerodynamic and safety advantage. Aerodynamically, contra-rotating fans offers higher aerodynamic efficiency than a single stage fans due to reduction in swirl losses. Also, failure of one fan does not lead to complete loss of lift in the propulsor. The remaining fan stage and duct will continue to produce somethrust.

Where excess heat from the electric powertrain that is usually wasted is injected into the fans' down stream flow via an annular heat exchanger, additional thrust is generated with greater aerodynamic efficiency. The excess heat can be harvested via a cooling loop for the battery, motor and inverter using a liquid coolant, normally a dielectric. In addition to the advantage arising from injecting waste heat into the downstream flow of the propulsor, using an integrated cooling system has the advantage that collecting waste heat from each of the sub-systems—motor, battery, power electronics via a single cooling loop saves weight and complexity.

The propulsor of the present invention also has several features that will make the overall noise generation and pyschoacoustic impact significantly lower than traditional powertrains. First, the duct structure advantageously uses materials that will absorb noise from the contra-rotating stages. The heat exchanger should have a high heat transfer coefficient but will also have surface features for supressing noise from the boundary layer of the downstream flow.

In one embodiment of the invention, the trailing edge geometry of the duct will be modified with serrations to further reduce noise. The design and number of the blades in the contra-rotating stages may be optimised for low noise characteristics. The separation of the various aerodynamic surfaces (inlet/outlet vanes, contra-rotating fan stages) from each other may be designed for an acceptable pyschoacoustic signature.

The propulsor of the invention, preferably uses used a rim driven motor system to drive the contra-rotating fan as opposed to a hub-driven motor in traditional electric powertrains. The stators are located inside the duct while the rotor (permanent magnet) are embedded on to a ring that forms the outer tip of the contra-rotating fan stages. There are several advantages of using a rim driven system. Firstly, the motor is installed in the duct next to the battery pack instead of being installed in the hub, removing the need for high-power cable connections that would otherwise increase weight and decrease efficiency. Secondly, the motor, inverter and battery share power management, thermal management, structural housing, and protection equipment leading to further weight and efficiency gains. Thirdly, since the hub does not contain an electric motor, it can be for high aerodynamic efficiency and to house the mechanical bearings for the fans. Another advantage is that tip losses are lower than in hub-driven systems, leading to higher aerodynamic efficiency. Furthermore, as motor is direct drive, the rotational speeds are quite low. Normally low rotational speeds require a high torque and heavy electric motor, because in traditional systems, the motor has to have a large radius. In this invention, the motor size can be small and lightweight while still producing the required torque. The motor can therefore fit comfortably within the aerodynamic duct.

Traditional electric powertrains employ separate thermal management systems for each part of the powertrain increasing weight and complexity. Cooling all powertrain sub-systems with a single loop using dielectric liquid cooling offers significant weight benefits advantages. Dielectric liquid cooling for batteries also enables higher charge rates and thermal runaway protection. In addition to the above functions, the thermal management system may also be used for de-icing of the module. Electrically driven propulsion modules do not have bleed air for de-icing that is usually available on gas turbines and piston engines. However, the cooling loop described here can advantageously perform de-icing functions for the module by using the heat generated by the electric powertrain to de-ice critical aerodynamic surfaces such as the inlet cowls. This may be achieved by ensuring the module cooling loop has channels passing through the critical aerodynamic surfaces.

The propulsor has built in redundancy into the design which are not seen in traditional powertrains. In a preferred arrangement of the present invention, each propulsor can have two sets of battery packs, inverters, and motors each driving one stage of the contra-rotating fans. Failure of any one system will not lead to a complete loss of thrust. The propulsor may adopt electrical coupling of motors, inverters, and batteries and/or mechanical coupling of the contra-rotating stages for further redundancy.

The propulsor may adopt a variety of variable geometry systems (e.g. inlet/outlet vanes) at the leading/trailing edge to optimise the overall mission performance for certain classes of electric vehicle such as eVTOLs that need to have propulsors which combine good hover performance and cruise performance The propulsor may use a variable pitch system to optimise the pitching angle of the contra-rotating stages depending on the mission cycle.

DESCRIPTION OF EMBODIMENTS

Figure 1:
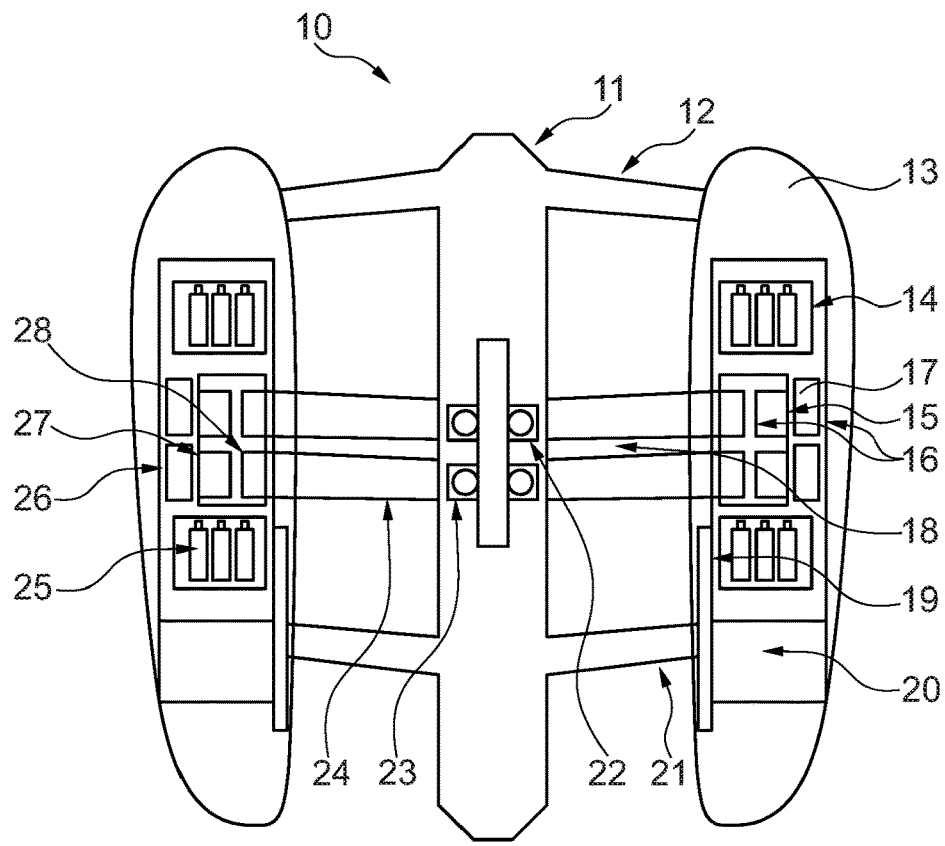
FIG. 1 is a schematic plan view of an example electric ducted fan propulsor according to the invention.
Figure 2A:
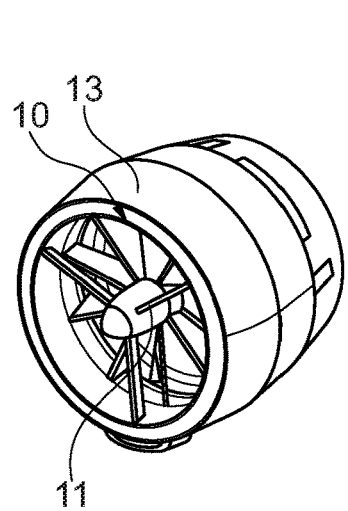
FIGS. 2A, 2B and 2C show perspective half left, front, and side views of the electric ducted fan propulsor of FIG. 1.
Figure 2B:
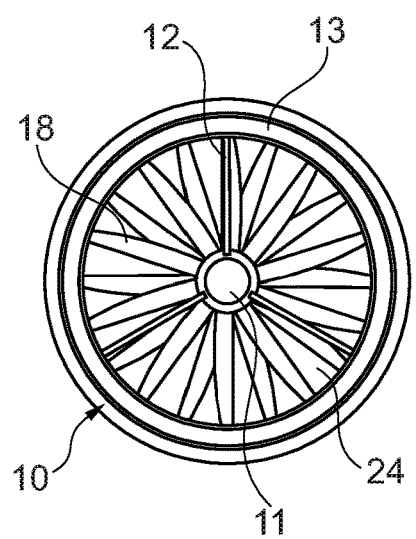
Figure 2C:
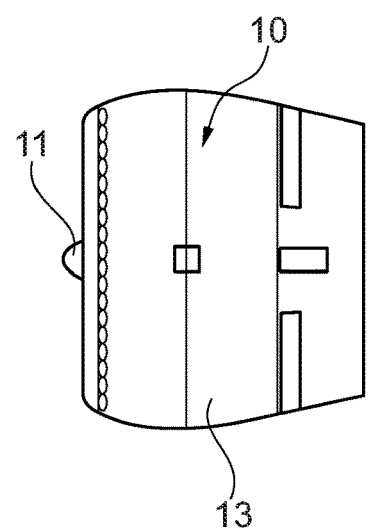

In FIGS. 1 and 2, an electric ducted fan propulsor 10 has a central hub 11, forming a static structure to hold bearing housings 22 and 23 and the contra-rotating fan stages 18 and 24. The central hub forms part of the load path for the load transfer of thrust from the fan stages into the duct and the aircraft.

Around the central hub 11 is disposed the duct 13, held in position by inlet guide vanes 12. The inlet guide vanes hold the central hub in position and enable the transfer of loads from the central hub into the duct structure and further on into the aircraft. The inlet guide vanes 12 also direct the flow into the propulsor and help reduce the impact of cross flows/inlet turbulence on thrust generation.

The duct 13, itself, acts as an aerodynamic surface augmenting the thrust from the fan stages. It houses the entire powertrain-motor, inverter, battery, thermal management system, the engine control unit, and other propulsion associated systems (such as sensors, data loggers, actuators). Additionally, it acts as a protective shroud against fan blade-off events and attenuates some of the noise from the fan stages. Furthermore, it acts as a protective shroud in the event of blade failure, provides a secondary source of thrust apart from the fan blades. Normally, the length to diameter ratio of the duct 13 is between 0.6 to 1.4.

The circular battery packs 14 and 25 are located towards the front of the shroud. These comprise contains electrochemical cells in a cylindrical format, (although prismatic cells could be used); lithium-ion cells are a preferred choice for these cells. The cells are arranged to achieve the highest capacity in the available space. The battery packs use dielectric liquid cooling which is shared between the motor and inverter. Each propulsor has two battery packs 14, 25, one pack 14 powering one fan stage 18 of the contra-rotating fan system, the other pack 25 powering the other fan stage 24. The waste heat generated by the battery packs is removed by the thermal management system described with reference to FIG. 5 and used to boost thrust.

Two motors with associated power inverters 17 and 26 convert the electrical power from the battery packs 14 and 25 to mechanical power that is harnessed by the contra-rotating fan stages 18 and 24 to generate thrust. Each motor independently providing mechanical power to each stage of the contra-rotating fan systems and comprises a stator 15 and 27 lying in the annulus of the duct and a rotor 16 and 28 for each motor consisting of permanent magnets arranged in a Hallbach array embedded onto the outer in ring of the contra rotating fan stages.

The contra rotating fan system comprises a first stage 18 and a second stage 24. Each stage consists of several fan blades attached to and inner ring attached to the bearing housings 22 (first stage 18) or 23 (second stage 24) and an outer ring comprising the electric motor rotors 16 and 28. The torque induced in the fan stage by electro-magnetic forces acting on the permanent magnets accelerate airflow through the contrarotating fans to produce thrust. Having a two stage contra-rotating fan system enables thrust production even after failure of a single fan stage or its associated energy/power source.

The central hub 11 also contains a variable pitch mechanism for the contra-rotating fan stages 18 and 24 to enable optimisation of the aerodynamic performance for different flight regimes of an aircraft to which the ducted propulsor is fitted.

Figure 4:
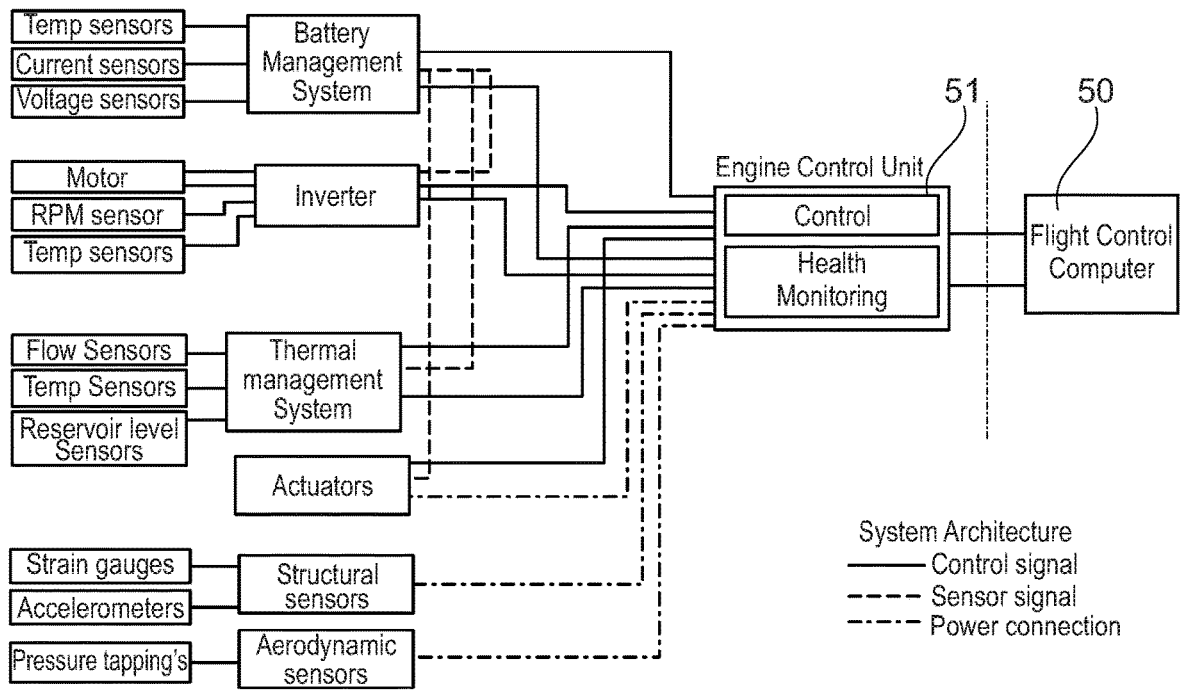
FIG. 4 is a block diagram for an engine control unit for an electric ducted fan propulsor of FIG. 1.
Figure 5:
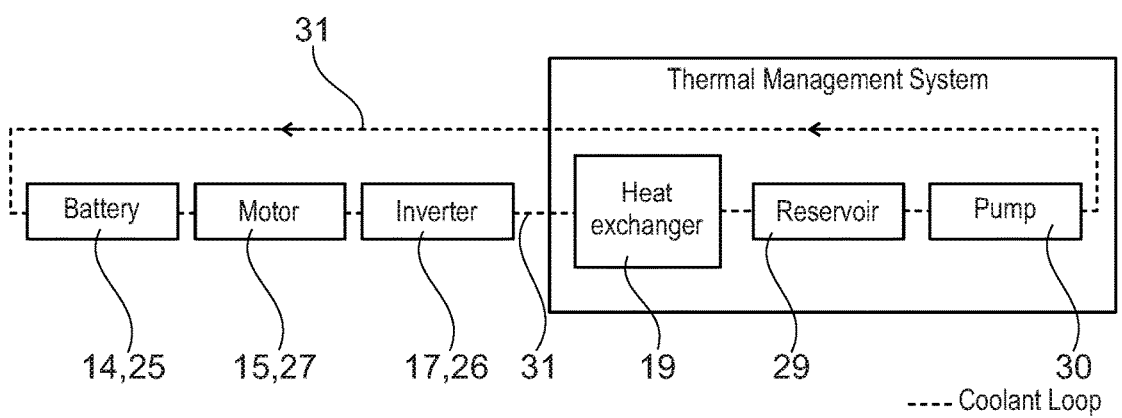
FIG. 5 is a block diagram of the thermal management system of the propulsor.
Figure 6:
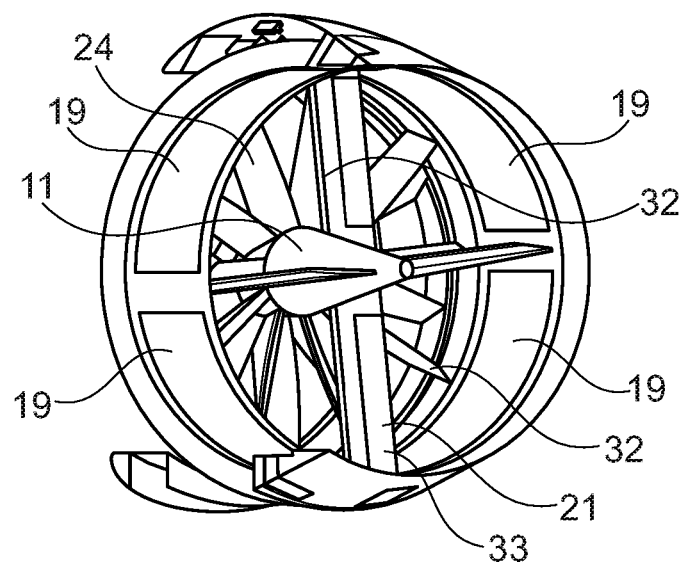
FIG. 6 shows the annular heat exchanger of the ducted electric fan propulsor of FIG. 1 seen from the rear of the duct of the ducted fan propulsor.

Around the duct 13, adjoining the downstream flow from the fans 18 and 24 is an annular heat exchanger 19, discussed further in relation to FIGS. 4, 5 and 6. This is connected to the thermal management unit 20 consisting of pipes, coolant, and pumps.

Toward the read of the duct 13, are exit vanes 21 between the duct 13 and hub 1. The exit vanes 21 may have control surfaces that deflect the flow to achieve aircraft control during certain flight regimes such as hover and transition.

Figure 3A:
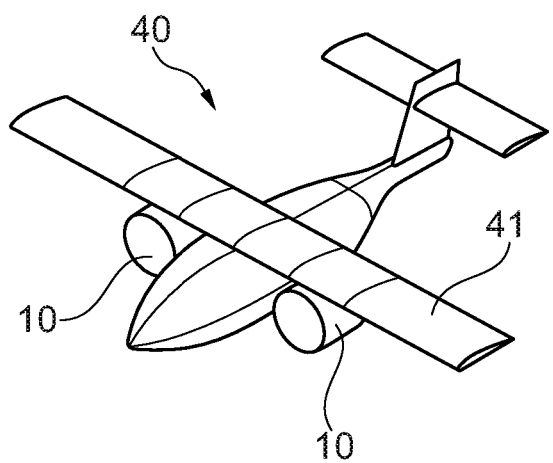
FIGS. 3A, 3B and 3C are schematic half left, top and front view an aircraft having two of the electric ducted fan propulsors of FIG. 1.
Figure 3B:
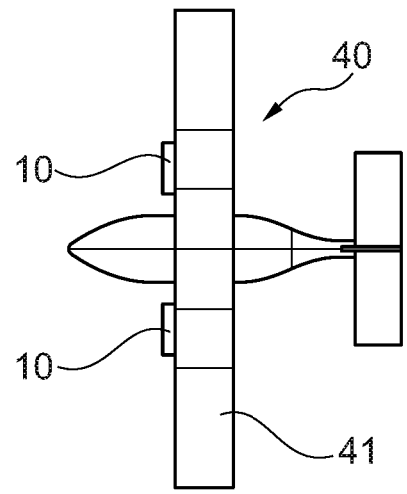
Figure 3C:
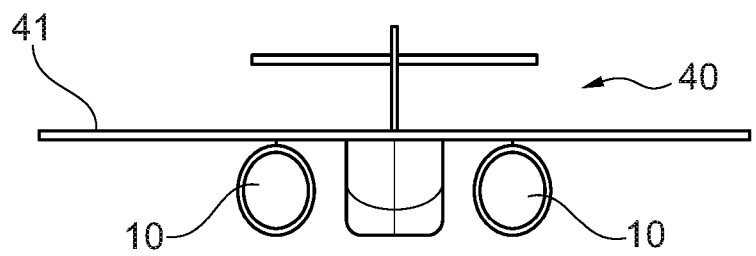

FIGS. 3A, 3B and 3C show two electric ducted fan propulsor 10 as described in relation to FIGS. 1 and 2 mounted beneath the wings 41 of an aircraft 40.

FIG. 4 illustrates a control system 51 for an aircraft incorporating an electric ducted fan propulsor according to the invention. The engine control system 51 includes electronics and algorithms that commands the various sub-systems of the propulsor, and also aggregates all the sensor input from various sub-systems and other parts of the propulsor to monitor health and usage in one location. The engine control system 51 communicates key information about the propulsor's health and usage to the aircraft flight computer 50 and receives key information from the aircraft flight computer 50 to command the various sub-systems.

FIG. 5 is a block diagram showing the thermal management system. The heat exchanger 19 is disposed around the inside of duct 13 (as seen in FIGS. 1 and 6). The heat exchanger imparts heat to the downstream flow from the contrarotating fans 18 and 24. A circuit of dielectric liquid 31, passes through a reservoir 29 and pump 30 to cool the electrochemical cell batteries 14 and 26, the motor stators 15 and 27, and invertors 17 and 26. improving the efficiency of these, to lose the heat gained through the heat exchanger 19 to the downstream flow. As described the dielectric fluid collects the waste heat from each sub-system and is pumped into the annular heat exchanger 19 from where the waste heat is transferred into the downstream flow from the contrarotating fans to produce additional thrust.

In addition to being used in producing the additional thrust as described in the preceding paragraph, heat taken from the powertrain can also be utilised for de-icing functions on the critical aerodynamic surfaces. In order to do this, the dielectric heated flow pass under the surfaces concerned. The flow to those surfaces would be controlled by a valve, so that the flow would only occur when de-icing was required, but not at other times, when the waste heat would be passed entirely to the heat exchanger 19.

FIG. 6 shows more detail of the annular heat exchanger 19 around the inside of the duct 3, adjacent to the downstream flow 32 from the contra rotating fans 18 and 24. Extending between the central hub 13 and the duct 11, are exit vanes 21, with control surfaces 33 which can deflect flow, to enable the aircraft to be maneuvered or controlled during certain flight regimes, such as hovering and transition.

Figure 7:
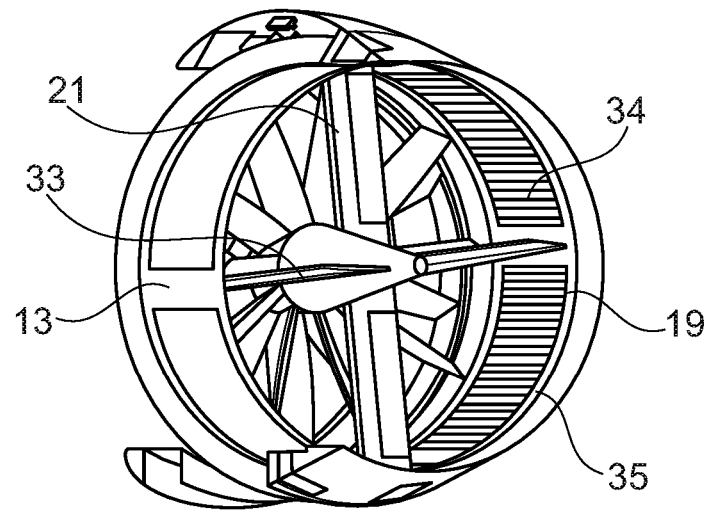
FIG. 7 shows a further enhancement of the annular heat exchanger of FIG. 6 having serrations on its surface to improving thermal performance and reduce noise.

FIG. 7 show a further development of the arrangement shown in FIG. 6, in FIG. 6, in FIG. 7 the surface of the heat exchangers 19 facing the downstream flow 32 has serrations 34 across the width of the heat exchanger. This has two benefits, as it increases the surface available for heat transfer and it reduces noise. As a further development the serrations 34 extend to the trailing edge 35 of the duct 13, further reducing noise.

The invention claimed is:

1. An electric ducted fan propulsion system for an aircraft characterised in having
    a two stage contra-rotating fan system comprising an aerodynamic duct surrounding contra-rotating fan stages providing contra-rotating fans to generate thrust, the aerodynamic duct defining an internal annular volume between inner and outer walls of the aerodynamic duct; the internal annular volume housing a power train within the internal annular volume,
    in which:
    the two stage contra-rotating fan system comprises
    a rim-driven motor system to drive the contra-rotating fans; the rim-driven motor system comprising: a pair of rings that form outer tips of the contra-rotating fans; each ring bearing embedded rotors for cooperating with respective stators located within the internal annular volume of the aerodynamic duct; the pair of rings and the embedded rotors both being housed within the internal annular volume of the aerodynamic duct;
    the power train comprises energy storage, electric motor drive and inverter, engine control unit, power distribution unit, and thermal management system.

2. The propulsion system according to claim 1 characterised in that the power train comprises two motors each comprising an annular stator supplied from an energy storage means in said aerodynamic duct and the embedded rotors of each motor comprising permanent magnets disposed in a ring around the outer tips of each fan stage, energy being supplied to the stator through the electric motor drive and inverter.

3. The propulsion system according to claim 2 characterised in that each motor is supplied from a respective energy storage means of the energy storage means that is independent of an energy storage means of the energy storage means of the other motor.

4. The propulsion system according to claim 1, characterised in that a length to diameter ratio of the duct is between 0.6 to 1.4.

5. The propulsion system according to claim 1 in which the contra-rotating fan stages are independently mounted on bearing housings in a central hub.

6. The propulsion system according to claim 1 characterised in that each fan stage may operate independently of the other fan stage in the event of failure of the other fan stage.

7. The propulsion system according to claim 1 having a thermal circuit, said thermal circuit taking heat generated in the power train and imparting the heat to air flow in the aerodynamic duct down-stream of the contra-rotating fans through a heat exchanger.

8. The propulsion system according to claim 7 in which the heat exchanger is disposed annularly around an inside of the aerodynamic duct downstream of the contra-rotating fans.

9. The propulsion system according to claim 8 in which the heat exchanger is serrated on a surface of the heat exchanger facing air flow downstream of the aerodynamic duct.

10. The propulsion system according to claim 1 characterised in that heat taken from the powertrain expands a downstream flow from the contra-rotating fans increasing thrust.

11. The propulsion system according to claim 1 characterised in that heat taken from the powertrain is utilised for de-icing functions on aerodynamic surfaces.

* * * * *